United States Patent Office 3,391,089
Patented July 2, 1968

3,391,089
CATALYST FOR THE STREAM REFORMING OF
NAPHTHA AND RELATED HYDROCARBONS
Bertrand J. Mayland, Jeffersontown, and Richard L. Harvin, Carl Robert Trimarke, and Charles S. Brandon, Louisville, Ky., assignors to Girdler Corporation, Louisville, Ky., a corporation of Ohio
No Drawing. Filed Sept. 8, 1964, Ser. No. 395,005
6 Claims. (Cl. 252—473)

ABSTRACT OF THE DISCLOSURE

Catalysts for use in the reformation of heavier hydrocarbons, and methods of making them comprising the steps of forming and drying pellets of a mixture containing nickel, refractory oxides and a binder capable of producing hydraulic bonds, calcining the pellets to convert at least some of the hydraulic bonds to ceramic bonds, impregnating the pellets with metal catalyst promoting compounds, the metal catalyst promoting compounds comprising from about 0.25% to about 0.95% by weight of the pellets. The metal catalyst promoting compounds may be compounds of alkali metals, compounds of alkaline earth metals, or both.

---

In a co-pending application in the names of the same inventors entitled, Process for the Catalytic Steam Reforming of Naphtha and Related Hydrocarbons, Ser. No. 372,862, filed June 5, 1964, procedures are set forth for the reformation of heavier hydrocarbons with steam, and somtimes additionally with air, to form gases rich in hydrogen and carbon monoxide, but usually containing as generated, lesser quantities of other gases such as carbon dioxide, water vapor, nitrogen, methane and the like. Naphthas are defined as mixtures of hydrocarbons averaging $C_7$ in the molecule, containing branched and straight chain hydrocarbons, some aromatics and olefins, including both saturated and unsaturated hydrocarbons, together (usually) with various impurities such as sulfur, and being liquid at room temperatures. The procedures there set forth are applicable to heavier hydrocarbons as well as naphthas.

In the co-pending application, the procedure involves, inter alia, steps of vaporizing the hydrocarbon material, treating it catalytically for the removal of sulfur and the saturation of unsaturated hydrocarbons, the addition of steam, and the reformation of the vaporized hydrocarbons in catalyst-filled tubes in a suitable furnace. The resultant gaseous mixture can be treated in various ways for purification.

The greatest difficulty encountered in the practice of such a process occurs during the reformation reaction wherein the vaporized heavy hydrocarbons have a tendency to crack with the resultant formation of carbon. The nickel-bearing catalysts heretofore employed for the steam reformation of lighter hydrocarbons such as methane and propane, these hydrocarbons being gaseous at room temperature, have not been found successful in the steam reformation of the heavier hydrocarbons. This is not a matter of catalytic activity as measured by the completeness of the reaction. Rather it is a matter of the relatively short life of the catalyst.

The commercial nickel-bearing catalysts when used for the reforming of naphtha or heavier hydrocarbons, promote undesirable side reactions, including the cracking and carbon deposition to which reference has already been made. The carbon is precipitated in the catalyst bed where eventually it interferes with the free passage of gases between and around the catalyst pellets. For some reason which is not immediately clear, the conditions which promote carbon deposition tend to bring about a disintegration of the catalyst pellets, hereinafter called "spalling and dusting," and as a result of which finely divided particles of the catalyst-bearing refractory tend to clog the catalyst bed at least to the extent mentioned in connection with the deposition of carbon; and a point is soon reached at which the catalyst bed becomes inoperative because of the excessively high pressure drop encountered in endeavoring to force the gases through the bed.

Furthermore, the passage of steam over the catalyst pellets in an endeavor to remove the carbon not only fails to remove the pulverulent material formed by the spalling and dusting, but tends to further the disintegration of the catalyst pellets. It is believed that this effect is due to the increase in the volume of the gaseous products produced by the steam treatment from carbon embedded in the surfaces of the catalyst pellets, so that disintegration of the pellets becomes quite rapid.

It is an object of this invention to provide a catalytic material which not only tends to inhibit the cracking of the hydrocarbons and the resultant deposition of carbon, but also greatly minimizes the disintegration of the catalyst pellets.

It has hitherto been understood by skilled workers in the art that the addition of an alkali metal such as potassium to a nickel-bearing reforming catalyst tends to suppress those undesirable side reactions leading to the deposition of carbon; but in general the efforts of prior workers have not resulted in satisfactory operation and in particular have not adequately prevented or inhibited the spalling and dusting of the pellets. Furthermore, the prior art workers have appeared to regard the various alkali metals as the equivalents of each other in catalyst promotion, and have not understood the proportions in which the additives should be used for optimum effects.

It is an object of the invention to provide a catalyst or catalyst-bearing substance containing alkali metal oxides or mixtures thereof giving superior and in some instances synergistic performance.

It is an object of this invention to provide a catalyst or catalyst-bearing substance which combines the suppression of carbon deposition with a remarkable and valuable suppression of the spalling and dusting phenomenon.

It is an object of this invention to provide a catalyst or catalyst-bearing material having the above advantages, and which provides greater catalytic activity and has a satisfactory service life as will hereinafter be more fully set forth.

It is an object of the invention to provide a catalyst or catalyst-bearing material which is of low cost and which can be produced by an inexpensive process in a form suitable for use in the catalyst tubes of reforming furnaces.

It is an object of the invention to provide improved procedures for the manufacture of catalyst pellets, and in particular for the manufacture of pellets which combine high catalytic activity with resistance to spalling and dusting under conditions of use.

These and other objects of the invention which will be set forth hereinafter or will be apparent to one skilled in the art upon reading these specifications, are accomplished in those procedures and in those catalysts or catalyst-bearing materials of which certain exemplary embodiments will now be described.

The catalyst base

The invention relates to forms of catalyst-bearing materials which are suitable in size and shape for use in the catalyst tubes or columns of reforming furnaces. Consequently, the specific size and shape of the catalyst-bearing masses do not constitute a limitation on the invention excepting where otherwise set forth herein. The masses may vary from Raschig rings or other complex shapes, to substantially cylindrical bodies formed by extrusion and cutting. For convenience herein all of these shapes will be referred to as "pellets." A typical shape which is convenient to use in catalyst tubes having a diameter of, say, 3 to 6 inches, is substantially cylindrical, ¼ to ½ in. in length and roughly a quarter inch in diameter. Such catalyst pellets form a bed through which the gases will pass easily so long as the bed is not clogged by carbon or by fine materials derived from the pellets themselves by spalling or dusting.

In commercial practice catalyst pellets for the steam reforming of light hydrocarbon have been made by mixing finely divided refractory materials such as magnesium oxide, alumina, silica, and combinations thereof, with a binder substance and nickel, or a nickel-bearing compound such as the oxide. After the mixing, the ingredients are plasticized through the use of water, formed into the desired pellets and then dried to make the pellets firm. The pellets may be produced from the plasticized mixture in any suitable way, including the extrusion and cutting mentioned above, or through the use of any of the known pelletizing presses. The binder may be a binder of Portland cement (a calcined mixture of limestone and clay or other aluminous substance); but other binders may be employed such as ceramic clays. Pellets made in this way and dried under a relatively low heat, are porous in character.

Introduction of alkali metal promoters

Although it has hitherto been known that the presence of alkali metal hydroxide will diminish the tendency of naphthas or other heavier hydrocarbons to crack and deposit carbon during the reformation operation, it is not feasible in the practice of this invention to add an alkali metal compound in dry powdered form or otherwise to the original mix. This is primarily because the alkali metal compound as hereinafter set forth in detail is used in such small quantities that a thorough mixing is a matter of considerable difficulty and expense, the resultant pellets tending to be non-uniform in character.

The porous nature of the conventional catalyst pellets, however, makes it possible to introduce the alkali metal compound in the form of a water solution, followed by drying.

For example, commercially prepared catalyst pellets containing 15 to 25% by weight, of nickel, calculated as nickel oxide, and from 85 to 75% by weight of refractory oxide material were divided into two separate increments. One of these increments was treated by soaking in a solution of potassium hydroxide containing 5 grams of the hydroxide per 100 cubic centimeters of water. This soaking resulted in a saturation of the pellets such that the pellets, after drying at 425° F., contained about 1% by weight of potassium measured as $K_2O$.

When the two catalyst increments were used in the same steam reforming operation on straight run naphtha, it was found that the second increment, treated as above set forth, gave distinctly better results than the untreated increment.

It was next discovered that if the conventional catalyst pellets were first calcined at a temperature of about 2200° F. for a period of about two hours before the application of the potassium hydroxide solution, still better results were obtained. It is believed that the calcination has the effect of converting the conventional hydraulic bond in the catalyst binder to a ceramic type bond which imparts greater strength to the catalyst pellets and hence diminishes the tendency of the pellets toward dusting and spalling. It was noted that conventional pellets, when calcined as described, suffered a slight but measurable reduction in catalytic activity; yet this reduction in activity may be compensated for by the use of proper quantities of the alkali metal compound or compounds while retaining all of the benefits of the calcination.

Introduction of alkaline earth metal promoters

In place of, or in addition to the addition of alkali metals, it is sometimes advantageous to introduce into the pellets an alkaline earth compound such as calcium hydroxide which will be converted to the oxide upon drying. The alkaline earth metals behave in some ways similar to the alkali metals; but they are sometimes of especial advantage in inhibiting carbon deposition and preventing dusting and spalling.

The introduction of alkaline earth metal compounds presents a certain difficulty in that their hydroxides have a relatively low solubility in water. If the pellets are treated in a water solution of calcium hydroxide, an addition of only about .2% or less of calcium, measured as the oxide, is possible. Moreover, the deposited calcium compound tends to be flaky and is rather easily leached from the surfaces of the catalyst pellets.

It has been found that this difficulty may be overcome by the dissolution of the calcium hydroxide in a solvent made up of about 85% glycerine to about 15% water. The catalyst pellets are soaked in this solution and then dried; and it has been found that in this way it is readily possible to obtain a net calcium addition (measured as the oxide) up to about 1% by weight of the catalyst pellets. Since the glycerine, which is a carbon bearing substance, remains in the pellets at least in part, it will be found necessary to remove any carbon formed by the decomposition of the glycerine. This may be accomplished, however, by heating the pellets to a temperature of around 1200° F. in air.

The hydroxides of other alkaline earth metals may be introduced in the same manner.

PROCESS EXAMPLE I

Commercial catalyst pellets of the type set forth above and containing nickel or nickel oxide were treated as follows:

(1) The pellets were calcined at 2200° F. for two hours in a furnace.

(2) When the calcined pellets had cooled to a temperature below the boiling point of water, they were immersed in a solution containing 5 grams of potassium hydroxide per 100 cubic centimeter of water for one hour.

(3) The pellets were then removed from the solution and dried under heat, the temperature being carried up to approximately 425° F.

(4) The pellets were again cooled and were immersed in a solution containing 5 grams of calcium hydroxide per 100 cubic centimeters of a solvent consisting of approximately 85% glycerine to approximately 15% of water. The time of immersion was again one hour.

(5) Upon removal of the pellets from the second mentioned solution, they were dried under heat and heated to about 1200° F. until all residual carbon had been removed.

The saturation in the potassium hydroxide solution and the subsequent drying gave a net potassium addition, measured as $K_2O$, of about 1% by weight. Also the calcium addition, measured as calcium oxide, was found to be about 1% by weight of the pellets.

As will later be made apparent, the quantities of potassium and calcium obtained in the catalyst are not necessarily those producing optimum results. However the example indicates the manner in which alkali and alkaline earth metals may be introduced into the catalyst base. Other alkali and alkaline earth metals may be substituted for those set forth. The precise quantities of the catalyst promoters can be quite acurately controlled by varying the strength of the solutions and by varying the times of immersion.

Nevertheless the specific procedure above outlined gave a catalyst material which when used in the steam reformation of naphtha was found to be of satisfactory catalytic activity and to have a diminished tendency to produce cracking of the hydrocarbons. The catalyst material had a satisfactory service life as hereinafter set forth, and was also effectively regenerable by a steam treatment without undue dusting and spalling.

It does not constitute a departure from the invention to add other metal compounds having catalytic or promotion activity, such for example, as rubidium, rhenium, and others, for special effects, increased activity, or a diminished tendency toward the cracking of the hydrocarbons. Depending upon the feed stock material to be reformed, changes may be made in the catalyst treatment procedure so as to conform the catalyst material more closely to the duty required of it. For example, when a naphtha or other hydrocarbonaceous substance containing a considerable amount of aromatic or cyclic compounds is to be reformed, it may be found desirable to increase the amount or number of promoters used, or both.

PROCESS EXAMPLE II

Commercial reforming catalyst pellets containing about 20% of nickel, calculated as the oxide, were subjected to the following treatments:

(1) The pellets were calcined at about 2200° F. for about 2 hours.

(2) After cooling to a temperature below the boiling point of water the pellets were immersed in a solution containing about 10 grams of potassium hydroxide per 100 cubic centimeters of water for about one hour.

(3) The pellets were removed from the solution and were dried under heat, the temperature being allowed to rise to approximately 425° F.

(4) Upon cooling the pellets were immersed in a solution containing 5 grams of cesium hydroxide per 100 cubic centimeters of water for about one hour.

(5) The pellets were dried under heat, the temperature being allowed to rise to approximately 425° F.

(6) Upon cooling, the pellets were immersed in a solution containing about 5 grams of calcium hydroxide per 100 cubic centimeters of a solvent made up of about 85% glycerine to about 15% water. The time of immersion was about one hour.

(7) The pellets were dried under heat, the temperature being allowed to rise to about 1200° F. until all residual carbon was removed.

This procedure resulted in a net addition to the pellets by weight of approximately 2% potassium, approximately 1% cesium and approximately 1% calcium, calculated as the oxides.

In the above example sodium or other alkali metal compounds may be substituted for potassium hydroxide or cesium and other alkaline earth metal compounds may be substituted for calcium. Reference has been made to the use of various compounds of the alkali, alkaline earth, and other catalyst metals. A wide choice of such other compounds may be used depending upon solubility in water or other available solvents. Keep in mind that compounds which would tend to leave in the pellets any substances, such as sulfur, which would poison the catalyst material should either be avoided or steps taken to remove these substances as by the use of heat. It will be noted upon comparing Example I with Example II, that the quantity of additive resident in the catalyst pellets as the result of a single immersion and drying can be controlled to a substantial extent by varying the concentration of the solution of the metal compound, solubility permitting. The length of time of immersion is also a controlling factor.

Using the catalyst produced in Example II above, a test run was made comparing the treated formulation with the basic non-treated catalyst material. Operating conditions were as follows:

|  | Treated | Untreated |
|---|---|---|
| Steam/carbon | 3.15/1 | 8.0/1 |
| Tube wall temperature, °F | 1,750 | 1,775 |
| Space velocity, hr | 6,800 | 1,250 |
| Air Used | No | Yes |
| Preheat Temperature, °F | 650 | 650 |
| Quantity of Catalyst, ft.$^3$ | .565 | .565 |

In this test, the untreated catalyst failed after only nine days of operation despite a high steam-to-carbon ratio, a low space velocity, and the addition of air. In the case of the treated catalyst, inspection was had after seven days of operation in the same test apparatus; and the inspection showed the catalyst to be unimpaired, and revealed the presence of only 0.5% fines.

Optimum quantities of catalyst promoters

Contrary to the teachings of the prior art, the alkali metal oxides are not the equivalents of each other either in their ability to resist carbon formation or in their ability to increase catalytic activity. There is reproduced below a chart constituting Example III wherein the oxides of potassium, lithium, cesium and sodium are contrasted in performance. The chart is derived from test data obtained in the same apparatus during runs of the same length in which naphtha was reformed.

EXAMPLE III

|  | Run #33-II | Run #40-II | Run #47-II | Run #49-II |
|---|---|---|---|---|
| Catalyst base | A | A | A | A |
| Additive calculated as— |  |  |  |  |
| R$_2$O, percent |  |  |  |  |
| K$_2$O, percent |  |  |  | 0.95 |
| Cs$_2$O, percent |  |  | 0.95 |  |
| Li$_2$O, percent |  | 0.95 |  |  |
| Na$_2$O, percent | 0.95 |  |  |  |
| Pressure of system | 97 | 96 | 97 | 96 |
| Top of reformer skin, °F | 1,605 | 1,616 | 1,625 | 1,620 |
| Catalyst bed temperature, °F | 1,605 |  | 1,615 | 1,630 |
| Flow Rate: |  |  |  |  |
| Naphtha pump rate, cc. min | 5.26 | 5.26 | 5.26 | 5.26 |
| Condensate pump rate, cc. min | 26.0 | 26.0 | 26.0 | 26.0 |
| Gas Analyses: |  |  |  |  |
| Percent CH$_4$ | 0.044 | 0.028 | 0.0756 | 0.0395 |
| Percent CO$_2$ | 15.18 | 15.0 | 15.3 | 15.1 |
| Percent CO | 12.76 | 12.4 | 12.44 | 11.3 |
| Percent H$_2$ | 72.02 | 72.77 | 72.18 | 73.56 |
| Condition of Catalyst Bed Dust or fines | (1) | (1) | (1) | (1) |
| Carbon | (2) | (3) | None | (4) |
| Damage to pellets | None | None | None | None |
| Crush strength | Good | Good | Good | Good |

1 Dust less than 0.1 gram.
2 Few pellets 10-15% top zone.
3 Few pellets 5-10% top zone.
4 Few pellets 5% top zone.

(1) Reference to the figures opposite the notation "Gas Analysis" in the left hand column will show that the residual methane content of the product gas stream, all other conditions being equal, varied from a low of 0.028% to a high of 0.0756%. In the order of decreasing effectiveness in catalytic activity, the tested additives may be listed thus: lithium, potassium, sodium, cesium.

(2) Reference to the figures opposite the notation "Carbon" will show that again the alkali metal oxides are not equivalents in their ability to resist carbon deposition. In the order of decreasing effectiveness in this particular, the alkali metal oxides may be listed: cesium, potassium, lithium, sodium.

Another series of tests and test results is set forth in the tabulation marked Exhibit IV and reproduced below:

EXAMPLE IV

|  | Run #39-II | Run #49-II | Run #100-II | Run #102-II |
|---|---|---|---|---|
| Catalyst base | A | A | A | A |
| Additive calculated as— |  |  |  |  |
| $R_2O$, percent |  |  |  |  |
| $K_2O$, percent | 2.4 | 0.95 | 0.25 | 0.40 |
| $Cs_2O$, percent |  |  |  |  |
| $Li_2O$, percent |  |  |  |  |
| $Na_2O$, percent |  |  |  |  |
| Pressure of system | 97 | 96 | 99 | 94 |
| Top of reformer skin, °F | 1,690 | 1,620 | 1,650 | 1,600 |
| Catalyst bed temperature, °F | 1,625 | 1,630 |  |  |
| Flow Rate: |  |  |  |  |
| Naphtha Pump rate, cc./min | 5.26 | 5.26 | 5.26 | 5.26 |
| Condensate pump rate, cc./min | 26.0 | 26.0 | 26.0 | 26.0 |
| Gas Analyses: |  |  |  |  |
| Percent $CH_4$ | 0.044 | 0.0395 | 0.0407 | 0.030 |
| Percent $CO_2$ | 15.1 | 15.1 | 14.9 | 15.5 |
| Percent CO | 12.4 | 11.3 | 12.62 | 10.8 |
| Percent $H_2$ | 72.46 | 73.56 | 72.44 | 73.67 |
| Condition of Catalyst Bed Dust or fines | (1) | (2) | (3) | (2) |
| Carbon | (4) | (5) | None | None |
| Damage to pellets | None | None | None | None |
| Crush strength | Good | Good | Good | Good |

1. 19.5 gms. of fines.
2. Dust less than 0.1 gm.
3. 1.25 gms. of fines.
4. Some 10-20% top zone.
5. Few pellets 5% top zone.

The purpose here was to ascertain the effect of the concentration or quantity of the catalyst promoter upon the activity of the catalyst.

(3) The tests shown under Example IV demonstrate the effect of the concentration of the additive upon the activity of the catalyst. Referring to the sub-section entitled, "Gas Analysis," and comparing the residual methane content to the corresponding percentage of the additive, in this case $K_2$, it is evident that an optimum percentage range exists. Catalysts containing less than 0.25% equivalent $K_2O$ show less activity (i.e. high residual methane) than do those containing 0.40% and 0.95% for example. However, catalysts containing 2.4% equivalent $K_2O$ are seen to be less active than those in the range between 0.25% to 0.95%. This is indicative that an optimum range does exist and is relatively low and narrow. This is contrary to the teachings of much of the prior art in which broad high ranges of 1% to 20% of the additive are mentioned.

It has been found that where single additives are used alone there is an optimum concentration lying within the range of about 0.25% to about 0.95% of the weight of the untreated catalyst.

Yet another series of tests and comparisons is shown in Example V. The purpose of this series of tests is to show certain synergistic effects which have been discovered in connection with the use of catalyst promoters of the alkali metal group.

EXAMPLE V

Comparison 1

|  | Run #47-II | Run #48-II | Run #49-II |
|---|---|---|---|
| Catalyst Base | A | A | A |
| Additive calculated as— |  |  |  |
| $R_2O$, percent |  |  |  |
| $K_2O$, percent |  | 0.95 | 0.95 |
| $Cs_2O$, percent | 0.95 | 0.95 |  |
| $Li_2O$, percent |  |  |  |
| $Na_2O$, percent |  |  |  |
| CaO, percent |  |  |  |
| Pressure of system | 96 | 95 | 96 |
| Top of reformer skin, °F | 1,625 | 1,630 | 1,620 |
| Catalyst bed temperature, °F | 1,615 | 1,605 | 1,630 |
| Flow Rate: |  |  |  |
| Naphtha pump rate, cc./min | 5.26 | 5.26 | 5.26 |
| Condensate pump rate, cc./min | 26.0 | 26.0 | 26.0 |
| Gas Analyses: |  |  |  |
| Percent $CH_4$ | 0.0756 | 0.0101 | 0.0395 |
| Percent $CO_2$ | 15.3 | 15.36 | 15.1 |
| Percent CO | 12.44 | 11.33 | 11.3 |
| Percent $H_2$ | 72.18 | 73.29 | 73.56 |
| Conditions of Catalyst Bed, Dust or fines | (1) | (1) | (1) |
| Carbon | None | (2) | (2) |
| Damage to pellets | None | None | None |
| Crush strength | Good | Good | Good |

See footnotes at end of example.

Comparison 2

|  | Run #40-II | Run #59-II | Run #43-II |
|---|---|---|---|
| Catalyst Base | A | A | A |
| Additive calculated as— |  |  |  |
| $R_2O$, percent |  |  |  |
| $K_2O$, percent |  | 0.95 | 0.95 |
| $Cs_2O$, percent |  |  |  |
| $Li_2O$, percent | 0.95 | 0.95 |  |
| $Na_2O$, percent |  |  |  |
| CaO, percent |  |  |  |
| Pressure of system | 96 | 92 | 153 |
| Top of reformer skin, °F | 1,615 | 1,670 | 1,640 |
| Catalyst bed temperature, °F |  | 1,625 | 1,645 |
| Flow Rate: |  |  |  |
| Naphtha pump rate, cc./min | 5.26 | 5.26 | 5.26 |
| Condensate pump rate, cc./min | 26.0 | 26.0 | 26.0 |
| Gas Analyses: |  |  |  |
| Percent $CH_4$ | 0.028 | 0.0189 | 0.038 |
| Percent $CO_2$ | 15.0 | 15.20 | 15.55 |
| Percent CO | 12.4 | 14.60 | 10.79 |
| Percent $H_2$ | 72.77 | 70.20 | 73.62 |
| Conditions of Catalyst Bed Dust or fines | (1) | (1) | (1) |
| Carbon | (3) | (4) | (5) |
| Damage to pellets | None | None | None |
| Crush strength | Good | Good | Good |

See footnotes at end of example.

Comparison 3

|  | Run #60-II | Run #40-II | Run #38-II |
|---|---|---|---|
| Catalyst Base | A | A | A |
| Additive calculated as: |  |  |  |
| $R_2O$, percent |  |  |  |
| $K_2O$, percent |  |  |  |
| $Cs_2O$, percent |  |  |  |
| $Li_2O$, percent | 0.95 | 0.95 |  |
| $Na_2O$, percent | 0.95 |  |  |
| CaO, percent |  |  | 0.95 |
| Pressure of system | .93 | .96 | .97 |
| Top of reformer skin, °F | 1,670 | 1,615 | 1,605 |
| Catalyst bed temperature, °F | 1,600 |  | 1,605 |
| Flow Rate: |  |  |  |
| Naphtha Pump rate, cc./min | 5.26 | 5.26 | 5.26 |
| Condensate pump rate, cc./min | 26.0 | 26.0 | 26.0 |
| Gas Analyses: |  |  |  |
| Percent $CH_4$ | 0.0323 | 0.028 | 0.044 |
| Percent $CO_2$ | 15.60 | 15.0 | 15.18 |
| Percent CO | 13.10 | 12.4 | 12.76 |
| Percent $H_2$ | 71.27 | 72.77 | 72.02 |
| Conditions of Catalyst Bed, Dust or fines | (6) | (1) | (1) |
| Carbon | (2) | (3) | (7) |
| Damage to pellets | None | None | None |
| Crush strength | Good | Good | Good |

See footnotes at end of example.

Comparison 4

|  | Run #43-II | Run #44-II | Run #38-II |
|---|---|---|---|
| Catalyst Base | A | A | A |
| Additive calculated as: |  |  |  |
| $R_2O$, percent |  |  |  |
| $K_2O$, percent | 0.95 | 2.4 |  |
| $Cs_2O$, percent |  |  |  |
| $Li_2O$, percent |  |  |  |
| $Na_2O$, percent |  | 0.95 | 0.95 |
| CaO, percent |  |  |  |
| Pressure of system | 153 | 94 | 97 |
| Top of reformer skin, °F | 1,640 | 1,660 | 1,605 |
| Catalyst bed temperature, °F | 1,645 | 1,610 | 1,605 |
| Flow Rate: |  |  |  |
| Naphtha Pump rate, cc./min | 5.26 | 5.26 | 5.26 |
| Condensate pump rate, cc./min | 26.0 | 26.0 | 26.0 |
| Gas Analyses: |  |  |  |
| Percent $CH_4$ | 0.038 | 0.119 | 0.044 |
| Percent $CO_2$ | 15.55 | 16.40 | 15.18 |
| Percent CO | 10.79 | 9.60 | 12.76 |
| Percent $H_2$ | 73.62 | 73.88 | 72.02 |
| Conditions of Catalyst Bed Dust or fines | (1) |  | (1) |
| Carbon | (5) | (8) | (7) |
| Damage to pellets | None | None | None |
| Crush strength | Good | Good | Good |

See footnotes at end of example.

EXAMPLE V—Continued

|  | Comparison 5 | | |
| --- | --- | --- | --- |
|  | Run #41-II | Run #44-II | Run #45-II |
| Catalyst Base | A | A | A |
| Additive calculated as: | | | |
| R₂O, percent | | | |
| K₂O, percent | 2.4 | 2.4 | 0.95 |
| Cs₂O, percent | | | |
| Li₂O, percent | 0.95 | | 0.95 |
| Na₂O, percent | | 0.95 | 0.95 |
| CaO, percent | | | 0.15 |
| Pressure of system | 97 | 94 | 96 |
| Top of reformer skin, °F | 1,675 | 1,660 | 1,640 |
| Catalyst bed temperature, °F | 1,630 | 1,610 | 1,600 |
| Flow Rate: | | | |
| Naphtha pump rate, cc./min | 5.26 | 5.26 | 5.26 |
| Condensate pump rate, cc./min | 26.0 | 26.0 | 26.0 |
| Gas Analyses: | | | |
| Percent CH₄ | 0.036 | 0.119 | 0.069 |
| Percent CO₂ | 15.0 | 16.40 | 15.6 |
| Percent CO | 12.6 | 9.60 | 10.6 |
| Percent H₂ | 72.33 | 73.88 | 73.73 |
| Conditions of Catalyst Bed Dust or fines | (1) | | (6) |
| Carbon | (7) | (8) | (9) |
| Damage to pellets | None | None | None |
| Crush strength | Good | Good | Fair |

1 Dust less than 0.1 gram.
2 Few pellets 5% top zone.
3 Few pellets 5-10% top zone.
4 Few pellets 15-30% top zone.
5 Few pellets 3% top zone.
6 Dust less than 0.5 gram.
7 Few pellets 10-15% top zone.
8 Some—30% top zone.
9 Few pellets 5-20% top zone.

(4) Referring to the three examples of comparison 1, it is seen that a combination of potassium and cesium results in greater activity (lower residual methane) than does either additive individually. Further, comparison 2 shows similar results for the combination of potassium and lithium.

The three examples of comparison 3, however, show no synergistic effect when a combination of lithium and sodium is used. The residual methane content remained at approximately the same value for all three examples. Non-synergism is again exhibited by comparsion 4 in which the combination of cesium and sodium is used. This combination actually results in a decidedly inferior level of catalyst activity than when either cesium or sodium is solely used.

(5) The three examples of comparison 5 are not as clear cut, but do indicate that simply adding larger numbers of additives does not result in the desired goals of greater activity, higher strength, and greater resistance to carbon deposition. Rather, careful selection of the specific additives and their quantities is of far greater value in securing the desired objectives.

A final series of tests has been reproduced herein as Example VI.

(6) The tests in Example VI demonstrate the finding that when combinations of additives that show synergistic effects are employed, the second additive is effective in very low concentration—of the order of 0.1%. Indeed, larger amounts have been found to be deleterious to the desired objectives. In comparison 1, it is seen that the formulation containing 0.35% $K_2O$ and 0.05% $Cs_2O$ shows superior activity (lower residual methane content) than either the formulation containing 0.40% $K_2O$ or the one containing 0.95% $K_2O$ plus 0.95% $Cs_2O$. This is again shown in comparison 2 wherein the combination of 0.95% $K_2O$ and 0.95% $Cs_2O$, which it will be recalled have been found to exhibit synergistic effects when used in smaller quantities, actually shows considerably poorer results than 0.95% $K_2O$ used above.

(7) It will further be evident that in the light of the above information additives and combinations of additives can be selected in consideration of the primary effect desired, taking into account the nature of the hydrocarbon being reformed and the processing conditions and apparatus at hand. The useful life of the treated catalyst pellets of this invention has been established at a minimum of 3 months, with much of the catalyst lasting for far longer periods, in some instances in excess of one year.

Modifications may be made in the invention without departing from the spirit of it.

The terms "additive" and "promoter" are used in this specification and in the claims which follow to signify substances which modify the action of the catalyst in any useful fashion, and are not to be taken as restricted to substances which increase catalytic activity as such.

The embodiment of the invention in which an exclusive property or privilege is claimed are defined as follows:

1. A process of making catalyst pellets which comprises forming and drying pellets of a mixture containing about 15% to about 25% by weight of nickel, calculated as the oxide, the remainder of said pellets consisting essentially of refractory oxides with a binder capable of producing hydraulic bonds, said pellets in the dry state being porous and saturable, calcining said pellets at a temperature of about 2200° F. for about two hours whereby to convert said hydraulic bonds at least in part to ceramic bonds, introducing into said pellets an hydroxide of an alkaline earth metal in a solvent consisting of about 85% glycerine and about 15% water, drying said pellets and heating them to a temperature of at least 1200° F. until carbon formed by dissociation of said glycerine is removed from said pellets and until said hydroxide is converted to the oxide.

2. A process for making catalyst pellets which comprises forming and drying pellets of a mixture containing

EXAMPLE VI

|  | Comparison 1 | | | Comparison 2 | |
| --- | --- | --- | --- | --- | --- |
|  | Run #102-II | Run #119-II | Run #48-II | Run #107-II | Run #108-II |
| Catalyst base | A | A | A | C | C |
| Additive calculated as— | | | | | |
| R₂O, percent | | | | | |
| K₂O, percent | 0.40 | 0.35 | 0.95 | 0.95 | 0.95 |
| Cs₂O, percent | | 0.05 | 0.95 | | 0.95 |
| Pressure of system | 94 | 92 | 95 | 90 | 88 |
| Top of reformer skin, °F | 1,600 | 1,675 | 1,630 | 1,675 | 1,595 |
| Catalyst bed temperature, °F | 1,620 | 1,615 | 1,605 | 1,620 | 1,605 |
| Flow rate: | | | | | |
| Naphtha pump rate, cc./min | 5.26 | 5.26 | 5.26 | 5.26 | 5.26 |
| Condensate pump rate, cc./min | 26.0 | 26.0 | 26.0 | 26.0 | 26.0 |
| Gas Analyses: | | | | | |
| Percent CH₄ | 0.030 | (1) | 0.0101 | 0.058 | 1.94 |
| Percent CO₂ | 15.5 | 19.6 | 15.36 | 12.7 | 18.31 |
| Percent CO | 10.8 | 4.87 | 11.33 | 10.1 | 9.05 |
| Percent H₂ | 73.67 | 75.53 | 73.29 | 77.1 | 70.70 |
| Conditions of Catalyst Bed, Dust or fines | (2) | (2) | (2) | (2) | (2) |
| Carbon | None | None | (3) | None | None |
| Damage to pellets | None | None | None | None | None |
| Crush strength | Good | Good | Good | Good | Good |

1 <50 p.p.m.
2 Dust less than 0.1 gram.
3 Few pellets 5% top zone.

about 15% to about 25% by weight of nickel, calculated as the oxide, the remainder of said pellets consisting essentially of refractory oxides with a binder capable of producing hydraulic bonds, said pellets in the dry state being porous and saturable, calcining said pellets at a temperature of about 2200° F. for about two hours whereby to convert said hydraulic bonds at least in part to ceramic bonds, impregnating said pellets with an alkali metal catalyst promoting compound capable of dissociation under heat to the oxide by immersing said pellets in a water solution of said alkali metal compound, thereafter drying said pellets under heat with a rise in temperature after drying to about 425° F., said alkali metal compound comprising from about 0.25% to about 0.95% by weight calculated as the oxide, of said pellets, and including the additional steps of immersing said pellets in a solution of alkaline earth metal hydroxide in a solvent consisting of about 85% glycerine to about 15% water, drying said pellets and heating them to a temperature of about 1200° F. until carbon formed by dissociation of said glycerine is removed from said pellets.

3. The process claimed in claim 2 in which the strength of the solution of alkali metal compound is substantially 5 grams to substantially 10 grams per 100 cc. of solvent, the strength of the solution of alkaline earth metal compound is substantially 5 grams to substantially 100 cc. of solvent, and the times of immersion of the pellets in said solutions is in each instance about one hour.

4. The process claimed in claim 2 in which the strength of the solution of alkali metal compound is substantially 5 grams to substantially 10 grams per 100 cc. of solvent, the strength of the solution of alkaline earth metal compound is substantially 5 grams to substantially 100 cc. of solvent, and the times of immersion of the pellets in said solutions is in each instance about one hour, and in which the alkali metal compound is potassium hydroxide and the alkaline earth metal compound is calcium hydroxide.

5. The process claimed in claim 2 in which the pellets, between the said treatment in alkali metal compound solution and the treatment in the alkaline earth metal compound solution are immersed in a water solution of cesium hydroxide for about one hour, the pellets being then dried and heated to a temperature of about 425° F.

6. Catalyst pellets consisting essentially of refractory metal oxides, a binder capable of forming hydraulic bonds, from about 15% to 25% by weight, calculated as the oxide, of a nickel catalyst, from about 0.25% to about 0.95% of potassium oxide together with up to about 0.95% of the oxide of a metal chosen from the group consisting of lithium and cesium and mixtures thereof, said pellets being porous by reason of interstices therein and characterized by ceramic bonds as the result of calcination.

References Cited

UNITED STATES PATENTS

| 3,119,667 | 1/1964 | McMahon | 252—474 |
| 3,201,214 | 8/1964 | Fox et al. | 23—212 |
| 3,235,512 | 2/1966 | Koepernick | 23—212 |
| 3,320,182 | 5/1967 | Taylor et al. | 48—214 |

FOREIGN PATENTS

| 1,311,794 | 11/1962 | France. |
| 953,877 | 4/1964 | Great Britain. |

DANIEL E. WYMAN, *Primary Examiner.*

P. E. KONOPKA, *Assistant Examiner.*